United States Patent [19]

Nothen et al.

[11] Patent Number: 4,553,697
[45] Date of Patent: Nov. 19, 1985

[54] SYSTEM FOR SUPPLYING MOTOR VEHICLE DIESEL ENGINES WITH FUEL

[75] Inventors: Michael Nothen, Ascholding; Erhard Bartsch, Nersingen, both of Fed. Rep. of Germany

[73] Assignee: Webasto-Werk W. Baier GmbH & Co., Fed. Rep. of Germany

[21] Appl. No.: 583,403

[22] Filed: Feb. 24, 1984

[30] Foreign Application Priority Data

Mar. 12, 1983 [DE] Fed. Rep. of Germany ....... 3308891

[51] Int. Cl.$^4$ .................. B60H 1/02; F02N 17/02
[52] U.S. Cl. .................. 237/12.3 B; 123/142.5 R; 123/142.5 E; 123/549; 123/557; 123/179 G
[58] Field of Search .......... 123/142.5 R, 142 E, 123/557, 550, 551, 142.5 E, 514, 516, 179 G; 237/12.3 R, 12.3 B; 165/42; 219/205

[56] References Cited

U.S. PATENT DOCUMENTS 4,411,240 10/1983 Kravetz .................. 123/142.5 R
4,424,776 1/1984 Allen .................. 123/142.5 R
4,448,157 5/1984 Eckstein et al. .................. 123/142.5 R Primary Examiner—Henry Bennett
Attorney, Agent, or Firm—Sixbey, Friedman & Leedom

[57] ABSTRACT

A system for supplying motor vehicle diesel engines with fuel, having a fuel circulation system with a fuel supply pipe leading from a fuel tank, via at least one fuel filter, to an injection pump driven by the diesel engine; a fuel return pipe leading back to the fuel tank; a fuel-circulating pump that can be driven electrically and is not dependent on the operation of the diesel engine; and a heat exchanger for causing heat exchange between the fuel flowing through the fuel supply pipe and a liquid heat-transfer medium. Also, when the diesel engine is stopped, the fuel-circulating pump can be driven from an on-board power source. The fuel circulation system is arranged in such a way that, when the fuel-circulating pump is in operation, it is flushed by circulated fuel throughout its full length. An auxiliary heater located in the fuel circulation system may be used as a source of heat for the heat exchanger, as well as the vehicle interior, when the engine is not operating.

25 Claims, 2 Drawing Figures

SYSTEM FOR SUPPLYING MOTOR VEHICLE DIESEL ENGINES WITH FUEL

BACKGROUND OF THE INVENTION

This invention relates to a system for supplying motor vehicle diesel engines with fuel, having a fuel circulation system that has a fuel supply pipe leading from a fuel tank, via at least one fuel filter, to an injection pump driven by the diesel engine; a fuel return pipe leading back to the fuel tank; a fuel-circulating pump that can be driven electrically and is not dependent on the operation of the diesel engine; and a heat exchanger for causing heat exchange between fuel flowing through the fuel supply pipe and a liquid heat transfer medium.

In the case of a known mechanism of this type (DE-OS No. 3116441), the fuel-circulating pump, while the diesel engine is running, is fed by the motor vehicle battery. When the diesel engine is turned off, the feed circuit coming from the battery is interrupted. For the operation of the circulating pump, it must, via a rectifier, be connected to an external alternating-current power supply. In the switched-on condition, the circulating pump is used for the flushing-through of a circulating system leading from the fuel tank, via a coarse filter, the circulating pump and the heat exchanger back to the fuel tank. From the return pipe, at a point between the heat exchanger and the fuel tank, a pipe branches off which, via a fine-mesh filter, leads to the diesel engine. The engine coolant flows through the heat exchanger. In addition, the heat exchanger may have an electric heating element that can be connected to an external alternating-current power supply. In the case of the known mechanism, when the diesel engine is turned off, the fuel is stagnant in the fine-mesh filter, in the branch pipe containing the fine-mesh filter and in the return flow lines of the engine. When the outside temperature becomes lower, even though the circulating system (containing the coarse filter, the circulating pump and the heat exchanger) is flushed, a precipitation of paraffin can occur in the fine-mesh filter and in the pipes delivering the fuel that are located upstream of the branching point to the fine-mesh filter, to the injection pump and to the tank, i.e., especially in those parts which tend to become clogged because of crystallized paraffin. The heat exchanger must be able to transfer to the fuel, as a whole, a very large amount of heat because it must not only heat the fuel led to the engine via the branch pipe, but also the fuel that is delivered directly from the heat exchanger into the fuel tank. Practically, the whole content of the tank is heated. However, if no external supply connection is available, a flushing of the mentioned circulating system is no longer possible after the turning-off of the diesel engine. After the engine coolant has become cold, there is, by the way, in the case, also no heat energy available for the heat exchanger. The adaptability of the known mechanism is, therefore, considerably limited.

Therefore, the present invention has a principle objective of providing a fuel supply mechanism which is self-sufficient and requires little electrical energy so that the engine can also be started without problems when the outside temperatures are very low.

According to preferred embodiments of the invention, this objective is achieved by the fact that the fuel-circulating pump can be driven by an on-board power source when the diesel engine is stopped, and the fuel circulation is directed in such a way that, when the fuel-circulating pump is in action, its whole length is flushed by circulated fuel.

The system according to the invention does not require any connection to an external power supply. Because the fuel circulating system is flushed over its whole length, i.e., especially including the fine-mesh filter which is especially susceptible to the precipitation of paraffin, a comparatively low supply of electrical energy is sufficient, namely, only the driving energy of the fuel-circulating pump.

In accordance with further features, the fuel passage means of the heat exchanger, relative to the direction of flow of the fuel, is disposed in front of the fuel filter or filters. Preferably, it is arranged directly between the fuel tank and the fuel filter or filters. This has the advantage that fuel heated in the heat exchanger reaches the fuel filters that are critical with respect to the danger of clogging before the fuel has had the opportunity to cool off again because of the low outside temperature. Heat is essentially supplied only to the critical components, in which case the energy requirement is reduced further.

The fuel-circulating pump is expediently located in parallel to the injection pump. This may be a separate pump. However, preferably, the fuel-circulating pump is the fuel pump of an auxiliary heater located on-board and fed by fuel from the fuel-circulating system. Auxiliary heaters of this type having a forward and backward run of fuel are common in the case of vehicles driven by a diesel engine, such as trucks, buses, construction vehicles and other vehicles. Therefore, no additional fuel-circulating pump is required. In accordance with a further aspect of the invention, the heat exchanger is connected to the heat transfer-medium circulating system of the auxiliary heater located on board. Such an auxiliary heater, which is known (U.S. Pat. No. 3,779,229), is easily able to supply the heat energy required for the preheating of the fuel even when the outside temperatures are extremely low. It is expedient that the heat exchanger, in regard to its heat-transfer-medium passage, is connected directly to the outlet side of the heat-transfer-medium outlet of the auxiliary heater in order to keep heat losses on the way from the heater to the heat exchanger to a minimum. For the same reason, the heat exchanger is also advantageously arranged in direct proximity of the auxiliary heater. The heat-transfer-medium circulating system of the auxiliary heater may, in addition and in a known manner, be connectable to a cabin-heating circulating system and/or to the cooling-water circulating system of the diesel engine, such as in the case of the arrangement shown in U.S. Pat. No. 4,300,720. If necessary, another heat exchanger disposed in the fuel tank may also be connected to the heat-transfer-medium circulating system of the auxiliary heater. In order to be able to adapt, in an optimal manner, the heat supply to the different heat consumption means and to the respective requirements in regard to time and volume, it is expedient to provide setting members for the selective distribution of the heated heat-transfer-medium to the heat exchanger, the cabin-heating circulating system, the engine cooling-water circulating system and/or the other heat exchanger.

The conventional auxiliary heaters are provided with their own fuel filters that are adapted to the fuel consumption of the heater. In accordance with yet another aspect of the invention, the fuel filter or filters in the fuel-circulating system of the diesel engine are advantageously used for the filtering of the fuel burnt in the auxiliary heater. Since these filters are designed for the relatively large flow-through required for engine operation, even at extremely low outside temperatures and with a resulting precipitation of paraffin, the filters allow a volume of circulated fuel to pass through that is sufficient for the low requirements for the operation of the auxiliary heater. The auxiliary heater may, therefore, be started without problems, and, via the heat exchanger, it rapidly heats the fuel going to the filters to such a temperature that the filters become free and sufficient fuel can be supplied for operation of the engine. A part of the fuel-circulating system may be in direct heat-conducting contact with a heat exchanger of the auxiliary heater through which the heat-transfer medium flows. If, in a known manner, a prefeed pump, driven by th diesel engine, is disposed in the fuel-circulating system, a flap valve is switched in parallel to the prefeed pump which, when the engine is stopped, lets fuel pass through by by-passing the prefeed pump.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
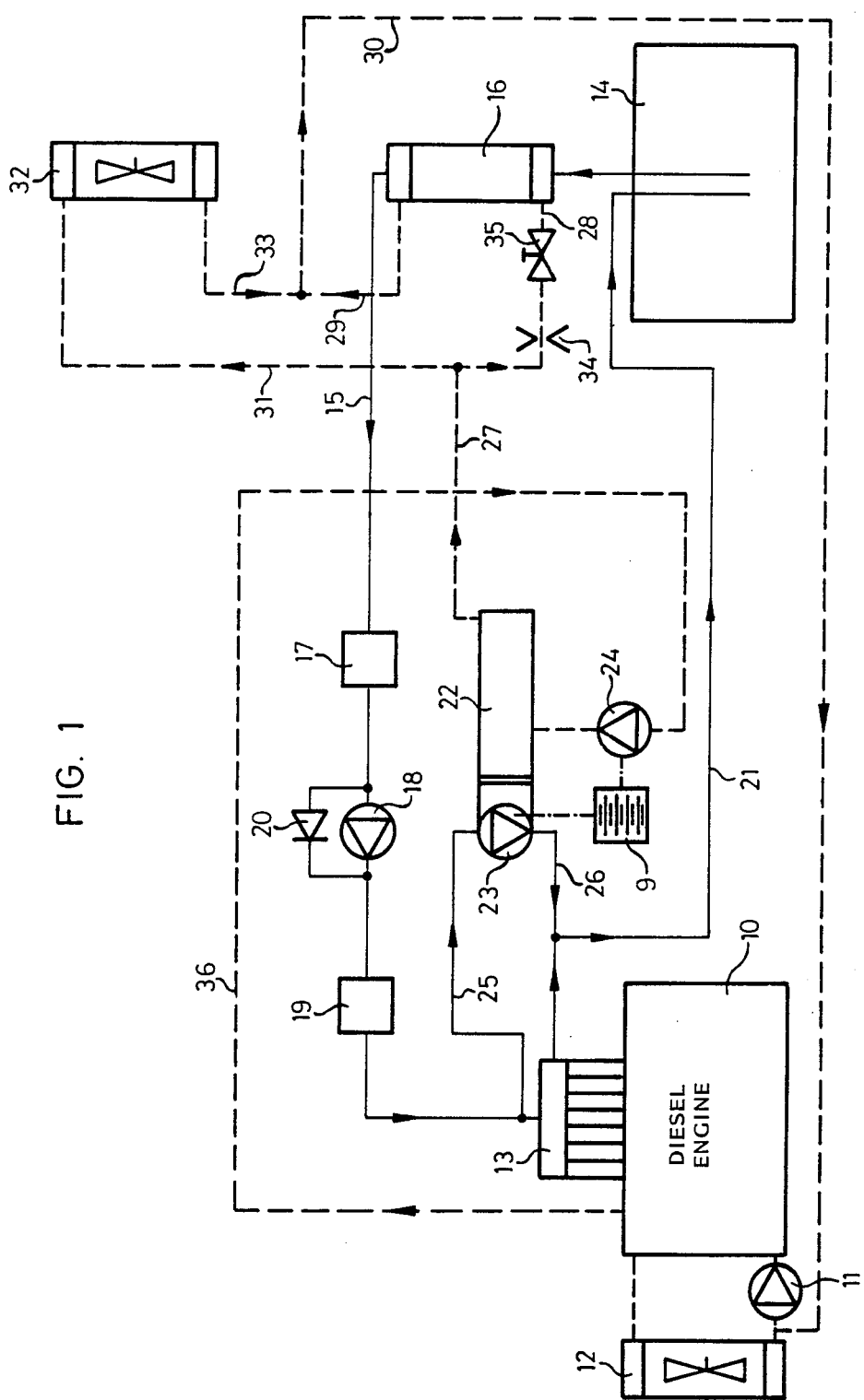
FIG. 1 shows a diagram of a system for supplying motor vehicle diesel engines with fuel according to a preferred embodiment of the invention.
Figure 2:
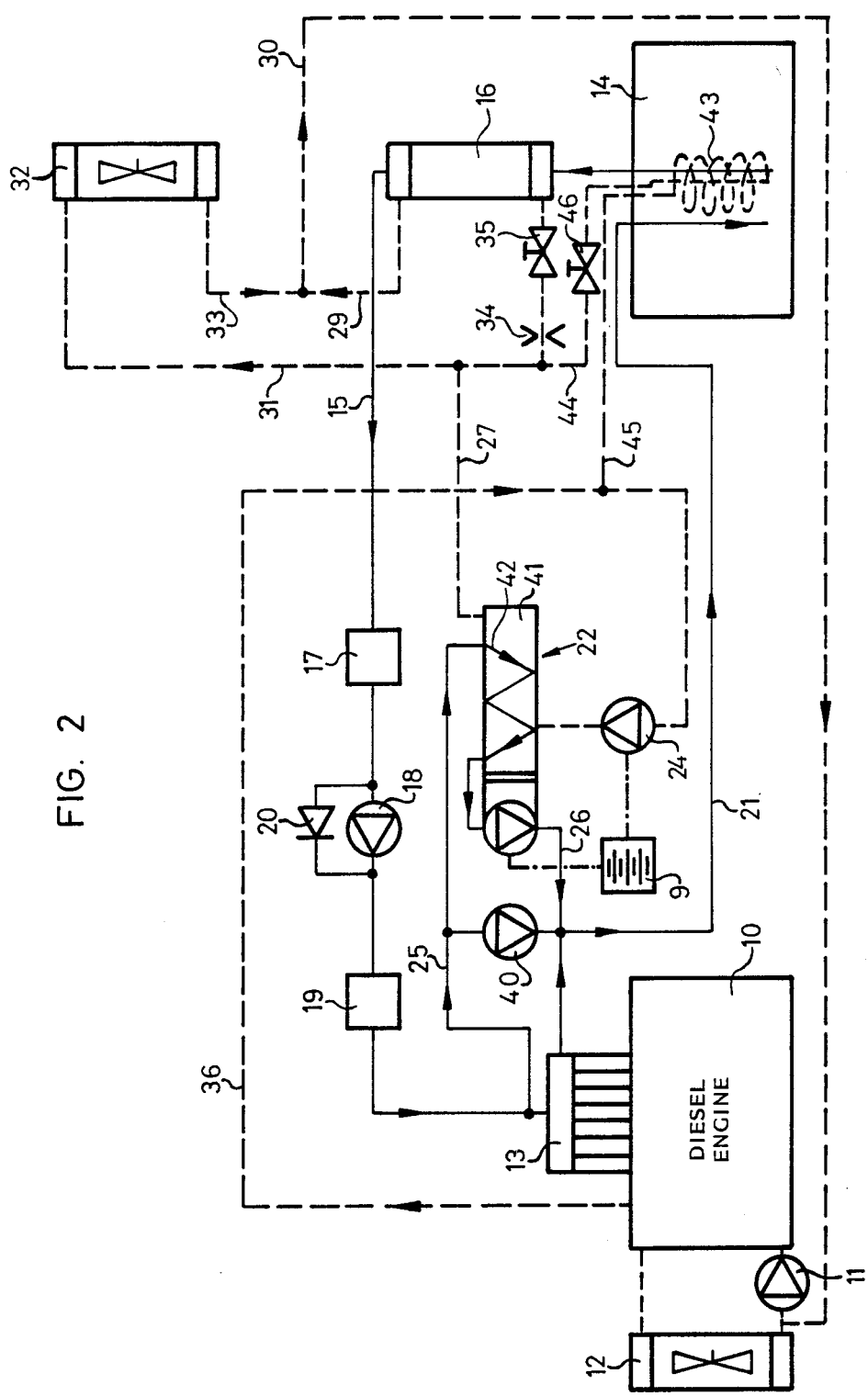
FIG. 2 is a view similar to that of FIG. 1, but for a modified embodiment.

In FIGS. 1 and 2, all fuel carrying pipes are shown in solid lines, whereas pipes carrying coolant, especially water, are shown in broken lines, and dash-dot lines represent electrical connections.

The diesel engine is shown as block 10. Coolants are conveyed through the engine 10 and a radiator 12 of conventional design by means of a circulating pump 11. The fuel supply to the cylinders of the engine 10 takes place by means of an injection pump 13. The fuel is taken from a fuel tank 14. It reaches the injection pump 13 via a fuel supply pipe 15 in which a fuel passage means of a heater exchanger 16, a preliminary filter 17, a prefeed pump 18 and a fine-mesh filter 19 are sequentially located. A flap valve 20 is arranged in parallel to the prefeed pump 18 and lets fuel pass in the direction from the fuel tank 14 to the injection pump 13. A fuel return pipe 21 leads from the engine 10 or the injection pump 13 back to the fuel tank 14. Additionally, an auxiliary heater 22 is provided along with a fuel pump 23 and a heat-transfer-medium circulating pump 24. The fuel pump 23 is disposed in parallel to the injection pump 13, i.e., its inlet side, via a pipe 25, is connected to the side of the fuel supply pipe 15 that leads to the injection pump 13, whereas a pipe 26, starting from the outlet of the fuel pump 23, is connected to the fuel return pipe 21. The circulating pump 11 for the coolant of the engine 10, the injection pump 13 and the fuel prefeed pump 18 are driven by the engine 10, while the pumps 23 and 24 of the auxiliary heater 22 are powered in a conventional manner (that is not shown in detail) from an on-board power source 9 (such as a battery) and do not depend on a connection to an external power supply system.

The heat-transfer medium conveyed through the auxiliary heater 22 by the circulating pump 24 and heated there, when the heater burner is turned on, is transferred via a pipe 27 and a branch pipe 28 to a heat-transfer-medium passage of the heat exchanger 16. The heat-transfer medium leaving the heat exchanger 16 flows to the inlet side of the circulating pump 11 via pipes 29, 30. After flowing through the engine 10, the heat-transfer medium returns to the circulating pump 24 via a pipe 36. From the pipe 27, another pipe, 31, branches off which leads to a heat exchanger 32 which, for example, is provided for heating the interior of the vehicle, such as its driver's cab or vehicle passenger compartment. The outlet side of the heat exchanger 32, via a pipe 33, is connected to the return pipe 30. In the branch pipe 28, a regulating element 34 is located,for example, in the form of a throttle, as well as a shut-off device 35. Corresponding regulating and shut-off devices (not shown) may, if necessary, also be disposed in the circulating system 31, 33 leading through the heat exchanger 32. The regulating and shut-off devices 34, 35, as well as any additional regulating and shut-off devices, serve to enable the heat-transfer medium, heated by the auxiliary heater 22, to be distributed to the different heat-consuming means in accordance with their respective requirements with regard to time and/or volume.

When the diesel engine is turned off, the fuel pump 23, fed by the vehicle battery 9, permits a circulation of fuel via the pipe 15, the heat exchanger 16, the preliminary filter 17, the flap valve 20, the fine-mesh filter 19, the pipes 25, 26 and 21, as well as the fuel tank 14, i.e., throughout the whole length of the fuel circulation system. Because the engine 10, together with the heated coolant represents a heat accumulator, and the injection pump 13 is in heat-conducting connection with the engine 10, and since another heat accumulator is formed by the fuel in the fuel tank 14, such a circulation of fuel may alone suffice in order to maintain the readiness of the engine 10 to start when the outside temperature is not excessively low and/or the time the engine is switched off is not excessively long, because there is no branch line for supply of fuel to the engine containing a filter that is not flushed and which, due to paraffin, accumulation can remain obstructed, as in the initially-mentioned prior art. In these cases, a burning of fuel in the auxiliary heater 22 is, therefore, not necessary. Instead, it is sufficient that the fuel pump 23 is operating. When the engine 10 is turned off for a longer period of time and/or when the outside temperature is lower, the burner of the auxiliary heater is turned on. The auxiliary heater 22 heats the heat-transfer medium conveyed by means of the circulating pump 24. Heat is supplied to the circulated fuel via the heat exchanger 16. Precipitations of paraffin in the fuel are avoided or dissolved. The filters 17, 19 become free. Clogging of the injection nozzles of the engine 10 is avoided. The fuel reaches the filters 17, 19 directly from the heat exchanger 16. Therefore, the whole content of the tank does not have to be heated, but only those parts of the system that are required for an effective fuel supply. The fuel to be burnt in the heater 22 is supplied directly via the filters 17, 19 which are designed for a relatively extensive flow-through. Consequently, the heater 22 may still be started perfectly when the fuel temperature is already lower than the fuel temperature that corresponds to the start of the precipitation of paraffin. The low volume of fuel that is required for the operation of the heater 22 is still let through even by partially clogged filters 17, 19. The start of the heater, under these conditions, can be facilitated by a known electrical short-time burner-nozzle preheater on the heater, such as that disclosed in commonly assigned U.S. Patent Application Ser. No. 253,863, filed Apr. 13, 1981.

In the case of the modified embodiment according to FIG. 2, a separate fuel-circulating pump 40 is utilized instead of the fuel pump 23 of the auxiliary heater 22, or in addition to this pump, said separate fuel-circulating pump 40 also being fed from the on-board power source 9. In contrast to the arrangement according to FIG. 1, the fuel pipe 25, via a part of its length, is in direct heat-conducting contact with a heat exchanger 41 of the auxiliary heater through which the heat-transfer medium flows. For example, the pipe 25 may be wound around the heat exchanger in the manner of a pipe coil, as shown in diagram form in FIG. 2. A heat exchanger 43 is provided in the fuel tank 14 which, via pipes 44, 45 and a regulating and/or shut-off device 46 disposed in the line 44, can have heat-transfer medium heated by the auxiliary heater 22 and/or the engine 10, circulated therethrough. The heat exchanger 43 supplies heat to the fuel located in the tank 14 and especially to the intake part of the fuel supply pipe 15 with the tank 14, the intake being shown situated within the coil forming heat exchanger 43.

Apart from the above modifications, the construction and method of operation of the system according to FIG. 2 corresponds to that of the embodiment according to FIG. 1. Furthermore, any of these modifications may be implemented in the FIG. 1 embodiment.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A system for supplying motor vehicle diesel engines with fuel, having a fuel circulation system loop, said fuel circulation loop comprising a fuel supply pipe leading from a fuel tank, via preliminary and fine mesh fuel filters, to an injection pump driven by the diesel engine; a fuel return pipe leading back from the injection pump to the fuel tank; a fuel-circulating pump that is operable independent of the operator of the diesel engine; and a heat exchanger for causing heat exchange between the fuel flowing through the fuel supply pipe and a liquid heat-transfer medium; wherein the fuel-circulating pump is drivable by an on-board power supply source, when the diesel engine is stopped, and the fuel system loop is arranged in such a way that, when the fuel-circulating pump is operated with the engine stopped, said fuel circulation system is flushed over its whole length by fuel circulated by the fuel-circulating pump, through the fuel supply pipe, heat exchanger, preliminary and fine-mesh fuel filters, return pipe, and fuel tank.

2. A system according to claim 1, wherein the heat exchanger is located in said fuel circulation system upstream of the at least one fuel filter in a direction of fuel flow therethrough.

3. A system according to claim 2, wherein the heat exchanger, with respect to the flow of fuel therethrough, is arranged directly between the fuel tank and the fuel filter.

4. A system according to claim 1, wherein the fuel-circulating pump is disposed in parallel to the injection pump.

5. A system according to claim 2, wherein the fuel-circulating is disposed in parallel to the injection pump.

6. A system according to claim 1, wherein the fuel-circulating pump is a separate pump.

7. A system according to claim 1, further comprising a liquid fuel fed auxiliary heater, a fuel pump of said auxiliary heater being arranged in the fuel circulation system so as to receive fuel therefrom for operation of the auxiliary heater, said fuel pump also serving as said fuel-circulating pump.

8. A system according to claim 2, further comprising a liquid fuel fed auxiliary heater, a fuel pump of said auxiliary heater being arranged in the fuel circulation system so as to receive fuel therefrom for operation of the auxiliary heater, said fuel pump also serving as said fuel-circulating pump.

9. A system according to claim 4, further comprising a liquid fuel fed auxiliary heater, a fuel pump of said auxiliary heater being arranged in the fuel circulation system so as to receive fuel therefrom for operation of the auxiliary heater, said fuel pump also serving as said fuel-circulating pump.

10. A system according to claim 9, wherein said heat exchanger is connected to a heat-transfer-medium circulating system of said auxiliary heater.

11. A system according to claim 8, wherein said heat exchanger is connected to a heat-transfer-medium circulating system of said auxiliary heater.

12. A system according to claim 7, wherein said heat exchanger is connected to a heat-transfer-medium circulating system of said auxiliary heater.

13. A system according to claim 12, wherein the heat exchanger is directly connected to the heat-transfer-medium outlet side of the auxiliary heater.

14. A system according to claim 13, wherein the heat exchanger is disposed in close proximity to the auxiliary heater.

15. A system according to claim 12, wherein the heat-transfer-medium circulating system of the auxiliary heater is also connected to at least one of a vehicle interior heating circulating system and a coolant circulating system of the diesel engine.

16. A system according to claim 15, comprising a fuel tank heater exchanger, said fuel tank heat exchanger being arranged in the fuel tank and connected to the heat-transfer-medium circulating system of the auxiliary heater.

17. A system according to claim 12, comprising a fuel tank heat exchanger, said fuel tank heat exchanger being arranged in the fuel tank and connected to the heat-transfer-medium circulating system of the auxiliary heater.

18. A system according to claim 16, comprising means for controlling the selective distribution of the heat-transfer medium to the heat exchanger, the vehicle interior heating circulating system, the engine coolant circulating system and the fuel tank heat exchanger.

19. A system according to claim 15, comprising means for controlling the selective distribution of the heat-transfer medium to the heat exchanger, the vehicle interior heating circulating system and the engine coolant circulating system.

20. A system according to claim 7, wherein said at least one filter also serves for the filtering of fuel fed to the auxiliary heater.

21. A system according to claim 7, wherein a part of the fuel circulation system is in direct heat-conducting contact with a heat exchanger of the auxiliary heater through which a heat-transfer medium flows.

22. A system according to claim 18, wherein a part of the fuel circulation system is in direct heat-conducting contact with a heat exchanger of the auxiliary heater through which a heat-transfer medium flows.

23. A system according to claim 19, wherein a part of the fuel circulation system is in direct heat-conducting contact with a heat exchanger of the auxiliary heater through which a heat-transfer medium flows.

24. A system according to claim 1, further comprising a prefeed pump disposed in the fuel circulation system and driven by the diesel engine, and a flap valve for the passage of the fuel when the engine is stopped disposed in parallel, by-passing relationship with respect to said prefeed pump.

25. A system according to claim 7, further comprising a prefeed pump disposed in the fuel circulation system and driven by the diesel engine, and a flap valve for the passage of the fuel when the engine is stopped disposed in parallel, by-passing relationship with respect to said prefeed pump.

* * * * *

UNITED STATES PATENT AND TRADEMARK OFFICE
CERTIFICATE OF CORRECTION

PATENT NO. : 4,553,697
DATED : November 19, 1985
INVENTOR(S) : Michael Nothen and Erhard Bartsch It is certified that error appears in the above-identified patent and that said Letters Patent are hereby corrected as shown below:

Item No. [73] Assignee on the cover page of the patent should read:

Webasto-Werk W. Baier GmbH & Co., Fed. Rep. of Germany and Iveco-Magirus AG, Fed. Rep. of Germany Signed and Sealed this Twenty-ninth Day of July 1986

[SEAL]

Attest:

Attesting Officer

DONALD J. QUIGG

Commissioner of Patents and Trademarks